T. H. ELLIOTT.
DUPLEX RAISIN AND LIKE CLEANER.
APPLICATION FILED FEB. 12, 1917.
1,246,572.
Patented Nov. 13, 1917.
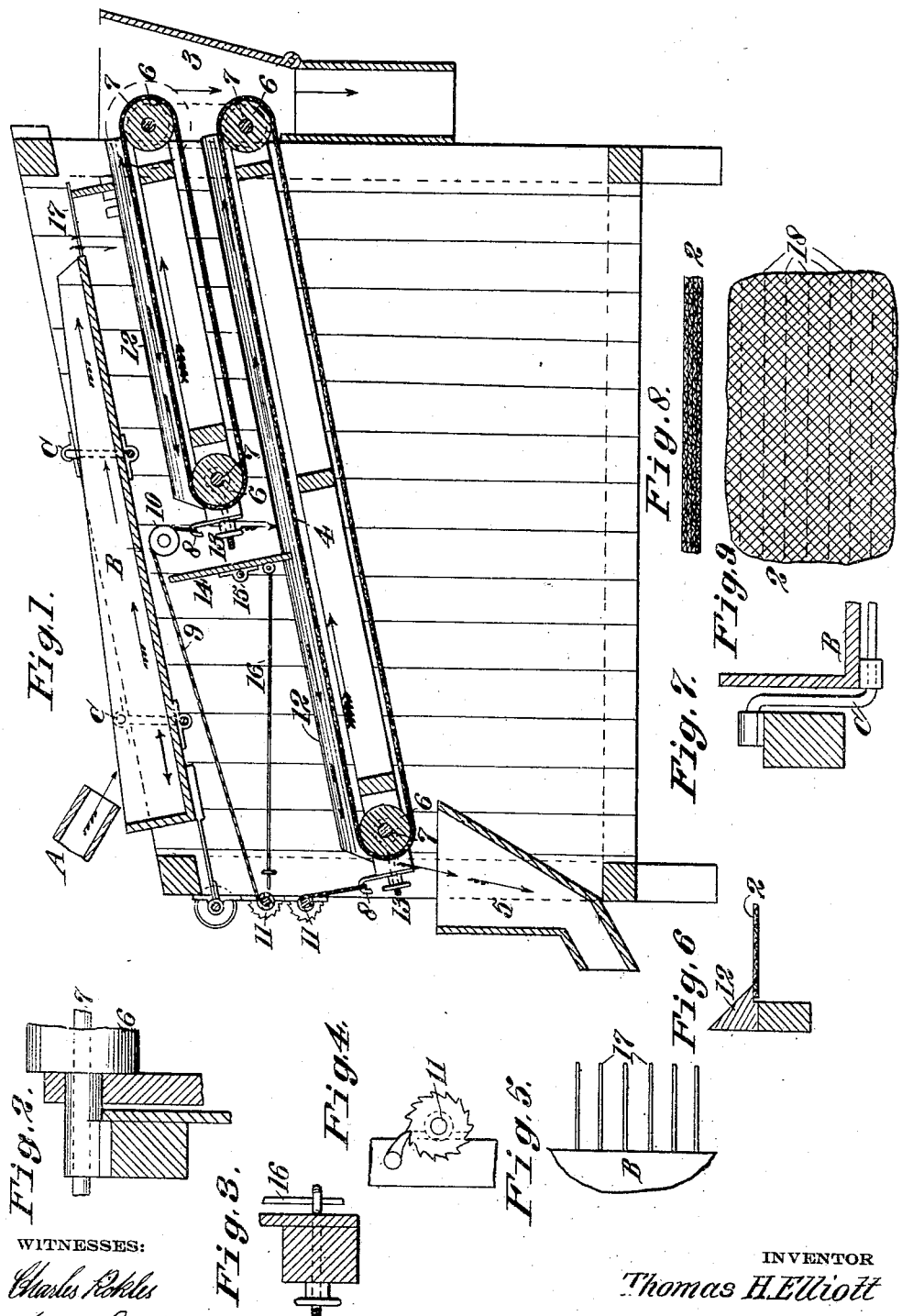
WITNESSES:
Charles Pokles
Thos Castberg
INVENTOR
Thomas H. Elliott
BY Strong & Townsend
ATTORNEYS

UNITED STATES PATENT OFFICE.

THOMAS HENRY ELLIOTT, OF SELMA, CALIFORNIA.

DUPLEX RAISIN AND LIKE CLEANER.

1,246,572.

Specification of Letters Patent.  Patented Nov. 13, 1917.

Application filed February 12, 1917. Serial No. 148,005.

*To all whom it may concern:*

Be it known that I, THOMAS H. ELLIOTT, a citizen of the United States, residing at Selma, in the county of Fresno and State of California, have invented new and useful Improvements in Duplex Rasin and Like Cleaners, of which the following is a specification.

My invention relates to an apparatus which is designed for separating stems, dirt, flat or mashed fruit from the more perfect fruit, and is applicable especially to raisins and like substances.

It consists of a shaker inclined at a suitable angle upon which the fruit is delivered, an inclined traveling belt located below the shaker adapted to receive the fruit in its various conditions, dirt, and other objectionable substances; this belt traveling upwardly but having such an angle that the perfect fruit will roll down over the lower end while the imperfect fruit and dirt will pass over the upper end. Below this belt is another inclined belt, upon which the perfect fruit falls from the lower end of the belt above and passes beneath a baffle board and eventually to the discharge at the lower end. A chute or receptacle, at the upper end, receives the stems, dirt and imperfect fruit which are discharged at a suitable point. Means are provided for changing the angle of the belts to suit the fruit being treated.

It also comprises details of construction which will be more fully explained by reference to the accompanying drawings, in which—

Figure 1 is a vertical, longitudinal section through the machine.

Fig. 2 is a detail view, showing the manner of supporting the belt frame.

Fig. 3 is a detail view of the clamping device for the adjustable belt tightener.

Fig. 4 is a detail view of the ratchet holding the elevating cord.

Fig. 5 is a detail view of the shaker fingers.

Fig. 6 is a section, showing the overlapping side bar of the belt.

Fig. 7 is a detail view of the suspension device for the shaking table.

Fig. 8 is a section of the feed belt.

Fig. 9 is a top view showing the stitching.

Raisins are usually passed through a stemming machine after having been dried, but a considerable quantity of small stems, dirt and raisins which have been mashed or flattened in the stemmers and cap stemmers, remain; and it is for the purpose of separating the perfect raisins from the imperfect ones and dirt, that this machine is designed. For this purpose the raisins are fed through a chute, as at A, and fall upon a shaking table B which is suspended by rocker arms or links C, so that it may be given an oscillatory motion in the direction of its length.

The fruit and other material is carried upward and discharged from the upper end of this shaking table, falling thence upon a moving belt 2 having a drop of about six inches, so that the perfect raisins will bounce when they strike the belt and the angle at which the belt is mounted is such that the more perfect raisins will roll down to the lower end of the belt. Those which are flattened, broken or otherwise deformed, will lie upon the belt, together with the dirt and small stems that may remain with the fruit, and refuse generally which may be associated with it. These are carried up and pass over the upper end of the belt and drop into a chute 3, by which they are carried to some point of discharge.

The perfect raisins falling off of the lower end of the belt 2 will be received upon a belt 4 which is in a like manner mounted upon bearing rollers; this belt also traveling upwardly where the raisins will roll down the belt and fall off of the lower end, being discharged into a receiving chute 5 or a proper receptacle. The belts are mounted upon drums 6 which are carried upon bearing shafts 7 mounted in the frame, as shown in Fig. 2.

In order to adjust the belts to suit the character of the product to be treated, the lower ends are made to be raised or lowered, and for this purpose I have shown a suspending link 8 to which a cord 9 is attached, passing over a pulley 10 just above the link; thence passing over a winding shaft 11 provided with a pawl and ratchet, or similar holding means, so that the angle at which the belts travel may be regulated.

In order to retain the fruit properly upon the belt, I have shown the side frames provided with an angular strip 12 which projects over the edge of the belt, as shown in Fig. 6, and the belt traveling beneath the edges of these strips on each side, will run closely enough to them to prevent the escape of the raisins and insure their continuing to the end of the belt where they are discharged.

In order to retain the belts at the proper tension I have shown them connected with draw boxes 13, which, by means of the nuts and screws, can be extended to maintain the proper tension. 14 is a baffle board located contiguous to the lower end of the upper belt; these belts being so situated that the fruit will have approximately a thirteen inch drop. This baffle board prevents the fruit from going down too fast and may be located approximately with the lower edge 1½ inches from the top of the lower belt. It is pivoted, as at 15, and has a connecting rod 16 extending to a convenient point, and by this the angle of the baffle board may be changed by tilting it backward or forward to suit the goods handled. This second belt then removes the stems, trash, etc., that the first belt did not dispose of and as it travels upwardly in the same direction this refuse will be delivered into the same chute 3 with the other.

The shaker B is fitted with fingers 17 extending out from its end, these being made of wire and spaced approximately a half inch apart and these fingers act to turn any stems or long refuse so that it will fall upon the upper belt, lying in the direction of travel of the belt, and between the raised stitching, which experience shows will cause such stems to pass out with the defective raisins while, if allowed to fall crosswise, the raisins would tend to carry the stems down to the lower discharge. It will be understood that these fingers may receive a screen perforated in such a manner as to practically do the same work. I have found a very satisfactory belt speed to be about one hundred thirty feet to the minute. The shaker may move at a speed of about four hundred oscillations, but practice will determine this point as the machine will not work if the belt is either too slow or too fast.

Various kinds of belts may be used for this purpose. The regular gandy belting, woven duck, paraffin treated, and plain canvas may be used with fair success. The belting which I have employed is formed with longitudinal stitching in rows raised slightly above the surface of the belt, as at 18, (Fig. 9). These rows may be approximately a quarter of an inch apart, and may assist to retain stems and other long refuse in the line of travel of the belt until discharged.

Having thus described my invention, what I claim and desire to secure by Letters Patent is—

1. In an apparatus for cleaning stemmed raisins and the like, a belt, shaking means above the belt having a discharge formed of a series of spaced fingers arranged to cause stems and elongated particles of refuse to extend lengthwise in the direction of the belt travel, and means on the belt providing a series of spaced channels extending lengthwise of the belt and parallel to the fingers to receive said stems and refuse, said channels being of a width less than that of the spaces between the fingers so as to prevent the perfect raisins from entering the channels.

2. In an apparatus for cleaning stemmed raisins and like fruit, shaking means, a traveling belt below said shaking means having means thereon to cause stems or elongated particles of refuse to extend lengthwise in the direction of the belt travel, and discharge means for the shaking means formed to cause said stems and refuse to extend lengthwise of said belt prior to reaching the latter, the discharge means and belt being spaced and arranged to allow the perfect raisins to bound up from the belt and gravitate down the latter.

3. In an apparatus for cleaning stemmed raisins and like fruit, shaking means, a traveling belt below said shaking means formed of roughened fabric, having spaced raised rows of longitudinally extending stitching thereon to cause stems or elongated particles of refuse to extend lengthwise in the direction of the belt travel, and discharge means for the shaking means formed to cause said stems and refuse to extend lengthwise of said belt prior to reaching the latter, the discharge means and belt being spaced and arranged to allow the perfect raisins to bound up from the belt and gravitate down the latter.

4. In an apparatus for cleaning stemmed raisins and like fruit, means to discharge the stems and elongated particles of refuse lengthwise thereof, and movable means provided with stem alining means arranged to receive perfect raisins from the discharge means to allow such raisins to bound up from said movable means and gravitate down the latter, said movable means being formed to receive and convey the stems and refuse in their said lengthwise arrangement.

5. In an apparatus for cleaning stemmed raisins and like fruit, means to discharge the stems and elongated particles of refuse lengthwise thereof, and an inclined endless belt provided with stem alining means arranged below the discharge means and moving with its upper flight toward the high end thereof, said belt being arranged to allow the perfect raisins to bound up therefrom and gravitate downwardly while the stems and refuse are being carried upwardly.

6. In a raisin cleaner, an upper conveyer, a lower conveyer, the upper conveyer having its inner end terminating between the ends of the lower conveyer, means to adjust the inner ends of the conveyers so as to adjust the space between the two conveyers, a substantially vertical baffle adjacent and spaced from the inner end of the upper conveyer and extending adjacent the upper face of the lower conveyer, and means to enable adjustment of the angle of the vertical baffle.

In testimony whereof I have hereunto set my hand in the presence of two subscribing witnesses.

THOMAS HENRY ELLIOTT.

Witnesses:
T. P. BOOKER,
E. L. REESE.